Patented Aug. 4, 1925.

1,548,058

UNITED STATES PATENT OFFICE.

RAY E. NEIDIG, OF MOSCOW, IDAHO.

PLASTIC MODELING COMPOSITION.

No Drawing.    Application filed August 10, 1921.    Serial No. 491,101.

*To all whom it may concern:*

Be it known that I, RAY E. NEIDIG, a citizen of the United States, and a resident of Moscow, in the county of Latah and State of Idaho, have invented certain new and useful Improvements in Plastic Modeling Compositions, of which the following is a specification.

This invention relates to improvements in plastic modeling compounds, and more particularly to a plastic material especially adapted for use in modeling, as a substitute for clay or other plastic substances, such as used in schools for demonstrating purposes in scientific courses, as well as in kindergartens for the primary instruction of children in the fine arts, or as a workable material, affording amusement and entertainment. It may also be used commercially, in the trades, where prints or impressions form the basis of the work.

The purpose of the invention is to provide a clean and stainless modeling compound of proper and lasting texture, consistency and adhesion, as will produce the best results in its particular field of use, which is not limited to those purposes suggested, but for all purposes where a plastic material of such character is applicable.

In disclosing the nature of the compound it is to be borne in mind that, as in other chemically and physically incorporated mixtures, each ingredient may have numerous substitutes which differ somewhat in their chemical and physical properties but produce the same general type of reaction when brought together. It is for this generally known fact, that I prefer at the outset, to describe the compound in terms of the chemical series or group of substances employed, rather than a specific substance found by experiment to be best suited to produce the resulting product.

Following this procedure, therefore, the base or basis of the compound is the resulting product formed from the reaction between any and all inorganic bases, and any and all fatty acids or their esters, and usually termed soap.

Soaps may be divided into two classes, depending on the character of the inorganic base used, namely, soluble and insoluble soaps. The former is a product of the soap-making industry, sodium and potassium being the bases commonly used. The insoluble soaps are preferred as the basis of the compound, although under some conditions the soluble soaps may be used and therefore their bases are contemplated in this invention.

The sources of the fatty acids are equally numerous, including both vegetable and animal oils, fats or waxes, and all showing substantially the same chemical reaction in the presence of an inorganic base of saponifiable properties. The esters of the fatty acids may be considered as equivalents of the acids.

As a suitable fatty acid I have selected palmitic acid, its source being palm oil, although as I have already mentioned, any other fatty acid from any other source may be equally well employed.

As a suitable inorganic base I have selected aluminum or magnesium oxide (or hydroxide) or both, as the most desirable for use in the compound although zinc, calcium, or other metallic oxide (or hydroxide) may be substituted.

As heretofore suggested, the result of the chemical reaction between one of the fatty acids, say, palmitic acid, and one or more of the inorganic bases, say equal parts of aluminum and magnesium oxide, produces a desirable basis of the compound.

The chemical admixture of these ingredients may be carried out by adding to a boiling suspension of the base, sufficient of the fatty acid to meet the requirement for complete molecular reaction, the boiling continued until the reaction is completed. The resulting substance, obtained by separation from the water, is then allowed to dry, whereupon it assumes a dry, non-adhesive mass, capable of being reduced to a powder, and ground to any desired degree of fineness.

To this resulting ingredient is added sulphur, acting as a filler, and providing the desired degree of bulk to the final mixture. The mixture of sulphur is chiefly a physical one, having no appreciable chemical reaction. In fact, it may be considered as being practically an inert constituent.

To the whole is now added preferably a hydrocarbon, such as a mineral oil or petrolatum, the function of these hydrocarbons is that of a diluent, solvent and an adhesive agent, and acts not only to reduce the mixture to a plastic mass, but to give it the necessary adhesive and cohesive qualities although for reasons heretofore stated other substances may be used when it is desired to increase or decrease the adhesive and cohesive qualities. The amount of hydrocarbon added may vary, depending on the quantity necessary to produce the desired consistency of the ultimate compound.

If desired, inert coloring matter may be added to produce a pleasing and attractive tint to the compound.

Having described the general method of obtaining the compound, the proportions of each ingredient may be stated. Considering the basic ingredient, consisting of the selected inorganic base or bases, and fatty acid or acids as a single element of the combination, and termed insoluble soap, the following formula has been found to be satisfactory: Insoluble soap from 15% to 40%; sulphur from 35% to 75%; hydrocarbon from 10% to 40% or an amount to produce the desired consistency.

It is to be observed that the proportion of each ingredient varies between limits which might be considered extending over a range too widely separated for accurate application. However, it is pointed out that the compound may assume various degrees of consistency, depending on the purpose for which it is intended, and therefore, the particular character must be the result of experiment.

Among the advantages of a modeling compound embodying the invention may be mentioned a plastic substance that may be used continuously without depreciation or disintegration, or loss of its pliable and adhesive qualities, and in no degree does it become dry or hard. It does not require reinforcement in the modeling of structures of unusual mass or bulk, nor is it effected by changes in temperature or weather conditions. In the working of the compound, the worker's hands do not become soiled or sticky, nor does the compound itself undergo any alteration in contact with the hands.

Although I have disclosed a preferred embodiment of the invention, it is to be understood that I do not wish to be limited to any specific combination of ingredients, except in so far as heretofore suggested, and more specifically pointed out in the appended claims.

I claim as my invention—

1. A plastic modeling composition comprising a physical mixture of from 15% to 40% of a water insoluble soap from 35% to 75% of an inert filler and from 10% to 40% of a liquid hydrocarbon.

2. A plastic modeling composition comprising a physical mixture of from 15% to 40% of a water insoluble soap consisting of a metallic oxide and a fatty acid, 35% to 75% of an inert filler, and from 10% to 40% of hydrocarbon.

3. A plastic modeling composition comprising a physical mixture of from 15% to 40% of a water insoluble soap consisting of a metallic oxide and palmitic acid, 35% to 75% of sulphur and from 10% to 40% of mineral oil.

4. A plastic modeling composition comprising a physical mixture of from 15% to 40% of a water insoluble soap, consisting of aluminum oxide and palmitic acid, from 35% to 75% of sulphur, and 10% to 40% of mineral oil.

5. The process of making a plastic modeling composition, consisting of preparing a water insoluble soap, of a metallic oxide and a fatty acid, reducing the soap to a dry powdered consistency, and mixing from fifteen per cent (15%) to forty per cent (40%) of the soap with from ten per cent (10%) to forty per cent (40%) of liquid hydrocarbon, and an inert filler.

6. The process of making a plastic modeling composition consisting of preparing a water insoluble soap, of a metallic oxide and a fatty acid, reducing the soap to a dry powdered consistency, adding from 35% to 75% of an inert filler in finely divided form to from 15% to 40% of the soap, and mixing the resulting compound with sufficient mineral oil to reduce the same to a plastic workable state.

7. The process of making a plastic modeling composition, consisting of forming a water insoluble soap consisting of a fatty acid and a metallic oxide, driving off the water to reduce the soap to a dry consistency, mixing with from 15% to 40% of the soap, from 35% to 75% of sulphur and finally adding from 10% to 60% of mineral oil to reduce the whole to a plastic state of the desired consistency.

In witness whereof, I hereunto subscribe my name this 6th day of August, A. D. 1921.

RAY E. NEIDIG.